US008627761B2

(12) United States Patent
Giua

(10) Patent No.: US 8,627,761 B2
(45) Date of Patent: Jan. 14, 2014

(54) COFFEE MACHINE FOR COFFEE CAPSULES WITH SELECTIVE MANUAL OR AUTOMATIC CAPSULE ENGAGEMENT

(75) Inventor: Alberto Federico Giua, Gallarate (IT)

(73) Assignee: Luigi Lavazza S.p.A., Turin (IT)

( * ) Notice: Subject to any disclaimer, the term of this patent is extended or adjusted under 35 U.S.C. 154(b) by 226 days.

(21) Appl. No.: 13/142,720

(22) PCT Filed: Dec. 29, 2009

(86) PCT No.: PCT/IB2009/055976
§ 371 (c)(1),
(2), (4) Date: Jun. 29, 2011

(87) PCT Pub. No.: WO2010/076761
PCT Pub. Date: Jul. 8, 2010

(65) Prior Publication Data
US 2011/0265659 A1 Nov. 3, 2011

(30) Foreign Application Priority Data

Dec. 30, 2008 (IT) .............................. TO2008A1009

(51) Int. Cl.
*A47J 31/10* (2006.01)
(52) U.S. Cl.
USPC .......................... 99/289 R; 99/295; 99/302 P
(58) Field of Classification Search
USPC ...... 99/295, 284, 289 R, 302 P, 302 R; 74/45, 74/49, 523
See application file for complete search history.

(56) References Cited

U.S. PATENT DOCUMENTS

| | | | |
|---|---|---|---|
| 4,858,523 A * | 8/1989 | Helbling | 99/280 |
| 7,798,055 B2 * | 9/2010 | Mandralis et al. | 99/295 |
| 8,210,096 B2 * | 7/2012 | Fin | 99/295 |
| 2008/0041234 A1 * | 2/2008 | Cortese | 99/290 |
| 2010/0159108 A1 * | 6/2010 | Blanc et al. | 426/590 |
| 2010/0288132 A1 * | 11/2010 | Gavillet et al. | 99/295 |

FOREIGN PATENT DOCUMENTS

| | | |
|---|---|---|
| EP | 1 854 384 A1 | 11/2007 |
| EP | 1 859 713 A1 | 11/2007 |
| EP | 1854384 A1 * | 11/2007 |
| WO | 2005/115206 A1 | 12/2005 |

OTHER PUBLICATIONS

Joseph E. Ghigley, Charles R. Mischke, Richard E. Gustayson, Standard Handbook of Mechanical Design, Second Edition, pp. 41.1-41. 23, Copyright 1996, Published by McGraw-Hill.*

* cited by examiner

*Primary Examiner* — Henry Yuen
*Assistant Examiner* — John J Norton
(74) *Attorney, Agent, or Firm* — Sughrue Mion, PLLC

(57) ABSTRACT

A machine (1) operating with capsules for the preparation of coffee and other hot beverages is designed to be equipped selectively with a first motorized actuator module (44), which comprises a support (43) and a first electro-mechanical locking assembly (22) mounted on the support (43) so as to form a preassembled interchangeable module, and with a second manually operated actuator module (70), which comprises a second mechanical locking assembly (72) able to be releasably connected to a lever (5) which can be operated by a user so as to be manually actuated by means of the lever (5).

8 Claims, 3 Drawing Sheets

COFFEE MACHINE FOR COFFEE CAPSULES WITH SELECTIVE MANUAL OR AUTOMATIC CAPSULE ENGAGEMENT

CROSS REFERENCE TO RELATED APPLICATION

This application is a National Stage of International Application No. PCT/IB2009/055976, filed Dec. 29, 2009, claiming priority based on Italian Patent Application No. TO2008A001009, filed Dec. 30, 2008, the contents of all of which are incorporated herein by reference in their entirety.

The present invention relates to a coffee machine, in particular for domestic use, of the type operation with coffee capsules and suitable also for the preparation of other hot beverages by means of capsules containing suitable ingredients.

The invention also relates to a method of equipping coffee machines operating with coffee capsules, specifically so as to convert a machine operating in manual/mechanical mode into a machine operating in motorized/electrical (automatic) mode and vice versa.

It is known that in general a coffee machine for domestic use operating with coffee capsules comprises a machine body having, formed therein, an internal chamber for housing a capsule during use, a locking assembly acting on the capsule inside the chamber so as to lock the capsule between a thrust member and an abutment member and pierce the capsule, and hot water circulation means for circulating a flow of pressurized hot water through the capsule and obtaining an infusion. Depending on the contents of the capsule, the desired hot beverage (coffee, tea, etc.) is obtained.

The known machines comprise both manually operated machines, i.e. those where the user, for example by means of a lever which also has the function of pushing the capsule into the chamber, manually operates the locking assembly, and automatic machines, where the locking assembly is instead operated by an electro-mechanical or pneumatic actuator which is activated by the user via a switch or automatically when the capsule is inserted into the chamber.

The known machines are not entirely satisfactory, in particular in terms of simplicity of manufacture and maintenance.

In fact, the known machines, of both the abovementioned types (manual and automatic), are normally composed of a large number of components, usually specifically designed and manufactured for the specific use for which they are intended.

In particular, the two types of machine are normally designed and manufactured in a different manner, i.e. each type is specifically manufactured for operation in the initially predefined modes and cannot be modified to operate in another mode.

Moreover, since these machines are frequently returned to the manufacturers for overhaul and/or maintenance, there exists a need not only for rapid overhaul thereof, but also for possible modification of their configuration, depending on the specific requirements in any one moment. For example, there could be a need, in a certain period, to have several manually operated machines and, in another period, to have automatically operated machines.

It is an object of the present invention to provide a coffee machine which is without the abovementioned drawbacks of the prior art; in particular, it is an object of the invention to provide a machine which is relatively simple and inexpensive to produce and assemble and which allows also overhaul and maintenance operations to be performed easily and quickly.

A further object of the invention is to provide a method of equipping coffee machines allowing conversion, in a simple and rapid manner, of a machine which is designed to operate in manual/mechanical mode into a machine operating in motorized/electrical (automatic) mode and vice versa.

The present invention therefore relates to a coffee machine operating with coffee capsules as described with regard to its basic features in the accompanying claim 1 and its additional features in the dependent claims.

The invention also relates to a method of equipping coffee machines operating with coffee capsules, specifically intended to convert a machine operating in manual/mechanical mode into a machine operating in motorized/electrical (automatic) mode and vice versa, as defined in the accompanying claim 10.

The machine according to the invention is relatively simple and inexpensive to manufacture and assemble, comprising a small number of components compared to the known solutions.

Moreover, the machine according to the invention is designed so that overhaul and maintenance operations may be performed easily and quickly. In particular, the machine is configured so that it may be easily converted from a manual operation mode (i.e. purely mechanical mode where the capsule is locked by members operated manually by the user) into an automatic operation mode (where the capsule is instead locked by members operated by a motorized actuator, in particular via a gear motor) and vice versa.

The invention is further described in the following non-limiting examples of embodiment with reference to the accompanying figures in which.

Figure 1:
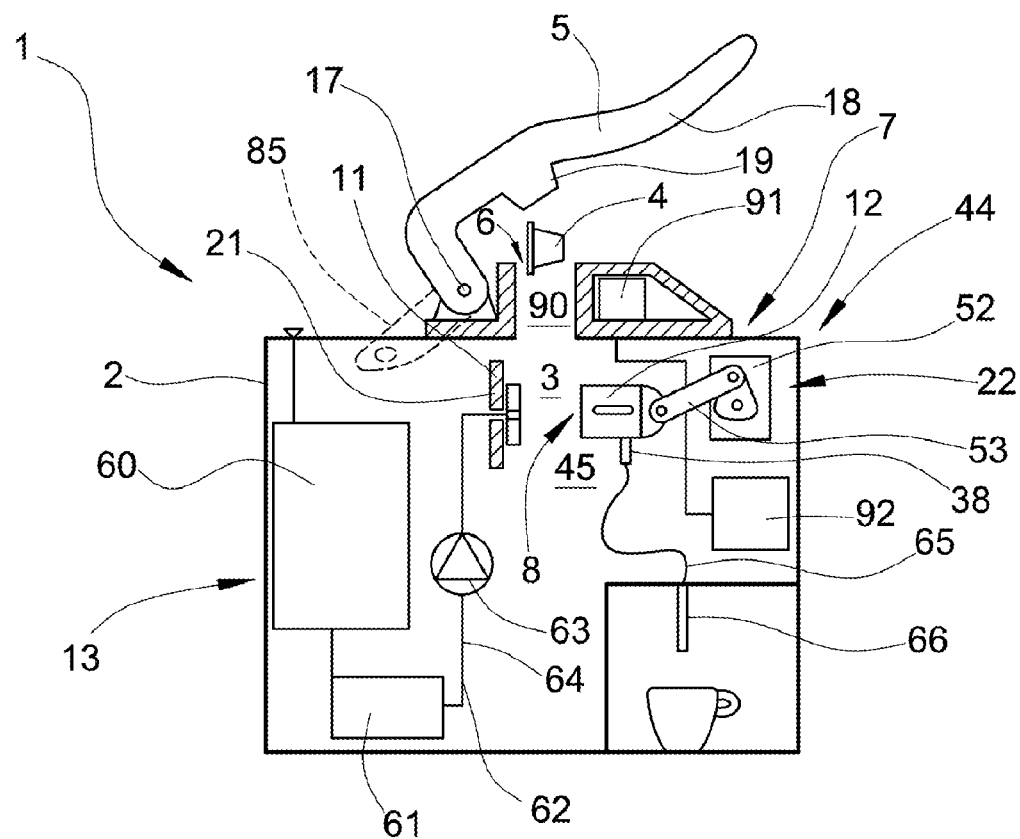
FIG. 1 is a schematic overall view, with parts removed for greater clarity, of a machine operating with capsules according to the invention.

With reference to FIG. 1, a machine 1 operating with capsules for the preparation of coffee and other hot beverages comprises a machine body 2 provided with an inner compartment 3 for housing a capsule 4 during use, a lever 5 for pushing the capsule 4 into the compartment 3 through an inlet opening 6, closing means 7 acting on the capsule 4 so as to enclose the capsule 4 inside an infusion chamber 8 defined by two oppositely arranged co-operating members 11, 12 and pierce the capsule 4 on opposite sides, and circulation means 13 for circulating a flow of pressurized hot water through the capsule 4 inside the infusion chamber 8.

Figure 2:
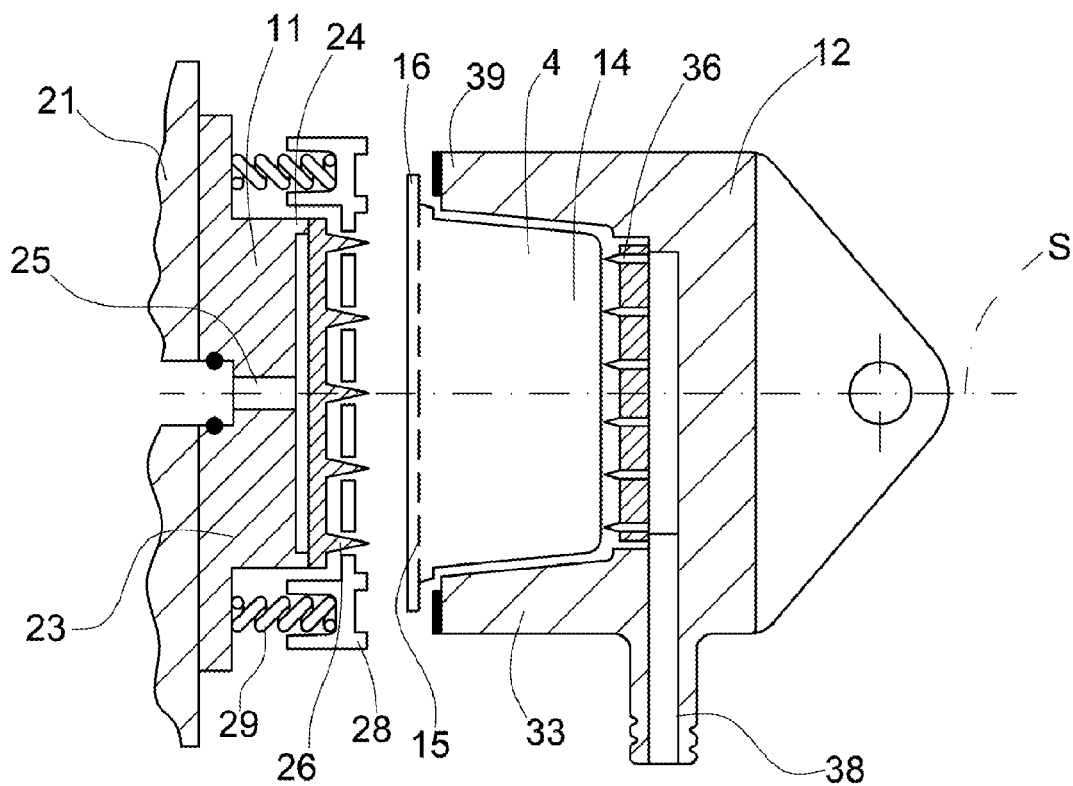
FIGS. 2 and 3 show a detail of two alternative embodiments of the machine according to FIG. 1.

As shown in greater detail in FIG. 2, the capsule 4 is, in particular, of the known type having a substantially cup-shaped sealed casing 14 which is closed by a lid 15 provided with a radially external annular edge 16; the capsule 4 contains coffee or other substances or infusion mixtures.

The lever 5 is hinged with the machine body 2 about a rotational fulcrum 17 and has a gripping portion 18 which can be operated by a user and a projecting portion 19 formed so as to push the capsule 4 inside the compartment 3 through the opening 6.

In the non-limiting example shown, the closing means 7 include a member 11, mounted on a wall 21 of the compartment 3 and a defining an abutment member, a member 12 movable with respect to the member 11 and defining a thrust member, and a locking assembly 22 operating on the member 12 so as to move it in a straight sliding direction S.

Figure 3:
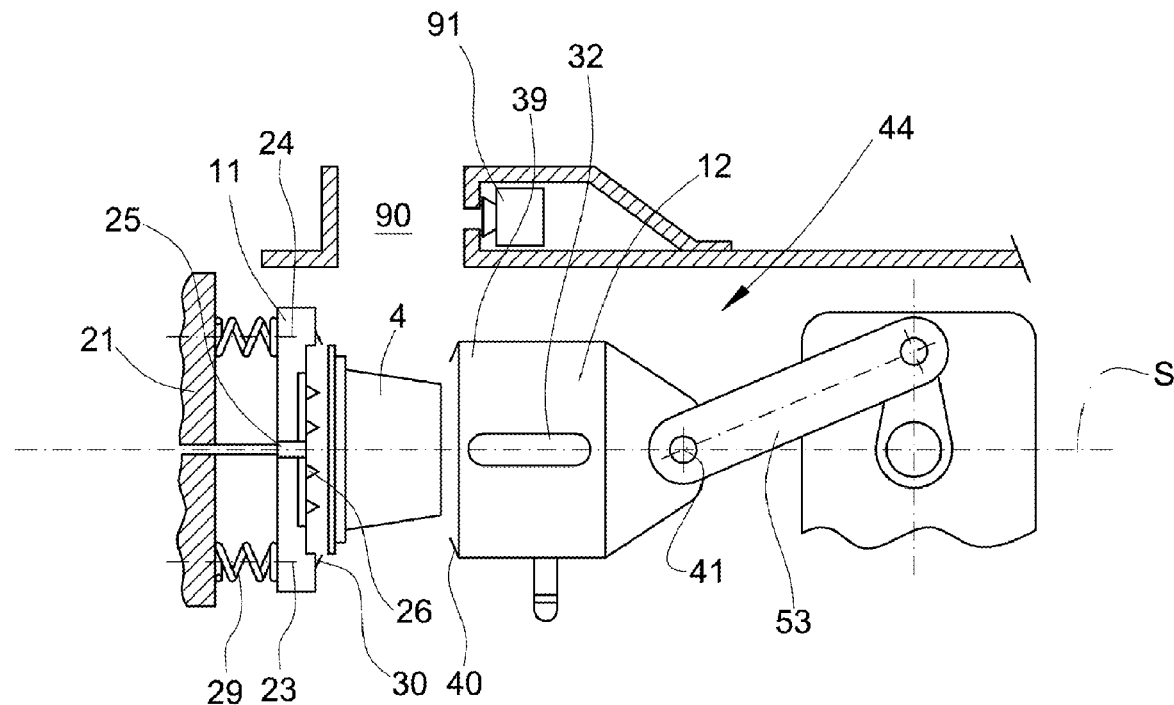

The abutment member 11 projects from the wall 21 and is fixed to the wall 21 (as shown for example in the embodiment according to FIG. 2) or is connected resiliently to the wall 21 (as shown for example in the embodiment according to FIG. 3).

In both cases, the member 11 comprises a plate 23, which is for example substantially circular and optionally provided with a raised, annular, perimetral edge 24, and has an inlet duct 25 and pointed front protrusions 26 associated with respective channels and designed to pierce the capsule 4.

In the embodiment shown in FIG. 2, the plate 23 is fixed to the wall 21 and projects from the wall 21; an annular sealing member 28 is arranged around the plate 23 and resilient opposition members 29 (springs) are arranged between the sealing member 28 and a stop formed on the member 11 (or on the wall 21).

In the example instead shown in FIG. 3, the member 11 is mounted on the wall 21 by means of resilient members 29 (springs) arranged between the member 11 and the wall 21; the edge 24 is optionally provided with a sealing ring 30.

Figure 4:
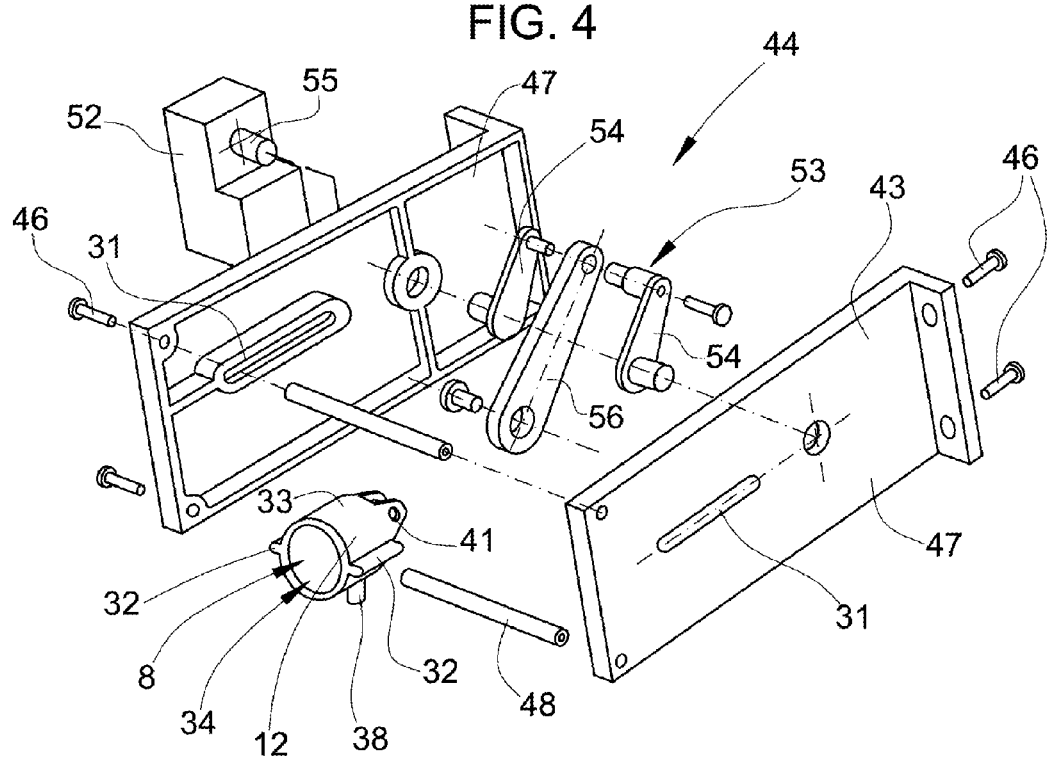
FIG. 4 is an exploded view of a first preassembled actuator module forming part of the machine according to FIG. 1.

With reference also to FIG. 4, the thrust member 12 is arranged facing the abutment member 11 and is slidable in the sliding direction S so as to be alternately moved towards the member 11 and away from it, being for example guided by special guides 31 parallel to the sliding direction S and engaged by projections 32 which project laterally from the member 12; in the case in question, the member 12 comprises a substantially cup-shaped hollow body 33 internally provided with a shaped seat 34 for receiving a capsule 4 and defining the infusion chamber 8; an end wall of the hollow body 33 has piercing needles 36 which are situated opposite the protrusions 26 of the member 11 and designed to pierce the capsule 4 and associated with respective channels converging into an outlet duct 38 situated behind the needles 36.

The member 12 also has a front edge 39 optionally provided with a sealing ring 40 (FIG. 3) configured so as to come into contact, during use, with the sealing member 28 (FIG. 2) or with the edge 24 of the member 11 (FIG. 3) so as to grip in a fluid-tight manner the annular edge 16 of the capsule 4 and define the infusion chamber 8 containing the capsule 4. The member 12 also comprises a rear joint 41 connected to the locking assembly 22.

The locking assembly 22 is an electro-mechanical locking assembly mounted on a support 43 so as to form a first actuator module 44 removably housed inside an inner receiving seat 45 of the machine 1 and fixed to the machine 1 by means of releasable fixing members 46 so that it may be removed from the receiving seat 45.

The support 43, for example consisting of a pair of facing plates 47 joined together by transverse spacers 48, is arranged inside the receiving seat 45 and is fixed to the machine 1 by means of the members 46 (for example screws or any other known releasable fixing member). The plates 47 are provided with respective slits which, engaged by the projections 32, form the guides 31.

The locking assembly 22 comprises a gear motor 52 and a connecting-rod/crank mechanism 53 which is operated by the gear motor 52 and connected to the member 12 by means of the joint 41. A crank 54 is connected to a shaft 55 of the gear motor 52 and moves a connecting rod 56 hinged with the joint 41, pushing the member 12 in the sliding direction S. Preferably, the connecting rod 56 is arranged between a pair of cranks 54, one of which is coupled to the gear motor 52 and the other one of which is mounted idle on the support 43.

The actuator module 44 is therefore an electrically operated, motorized, actuator module in which the locking assembly 22 is operated by means of an electrical control device (known and not shown) and moves the member 12 with an alternating, straight, translatory movement in the sliding direction S.

The circulation means 13 are of the essentially known type and are therefore not described or illustrated in detail for the sake of simplicity; in general terms, said means comprise a water reservoir 60, a boiler 61 and a hydraulic circuit 62 provided with a circulating pump 63; the circuit 62 has a hot water feed line 64, which connects the reservoir 60 to the boiler 61 and the boiler 61 to the inlet duct 25 formed in the member 11, and a beverage supply line 65 which connects the outlet duct 38 of the member 12 to the beverage supply nozzle 66.

Figure 5:
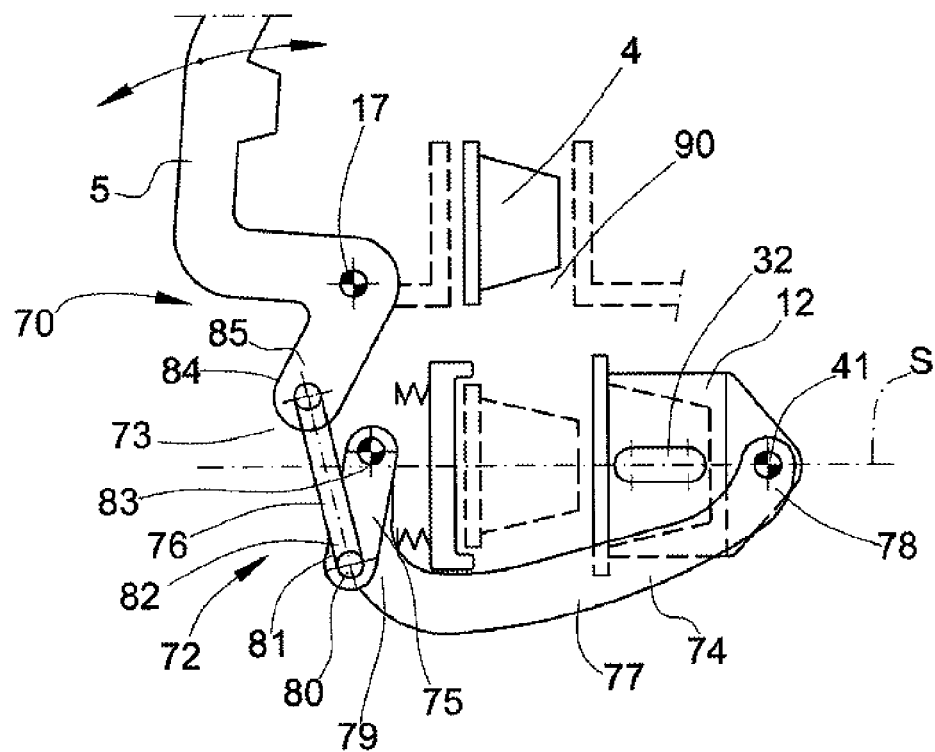
FIGS. 5 and 6 show a second actuator module interchangeable with the actuator module according to FIG. 4, shown in two operating positions.
Figure 6:
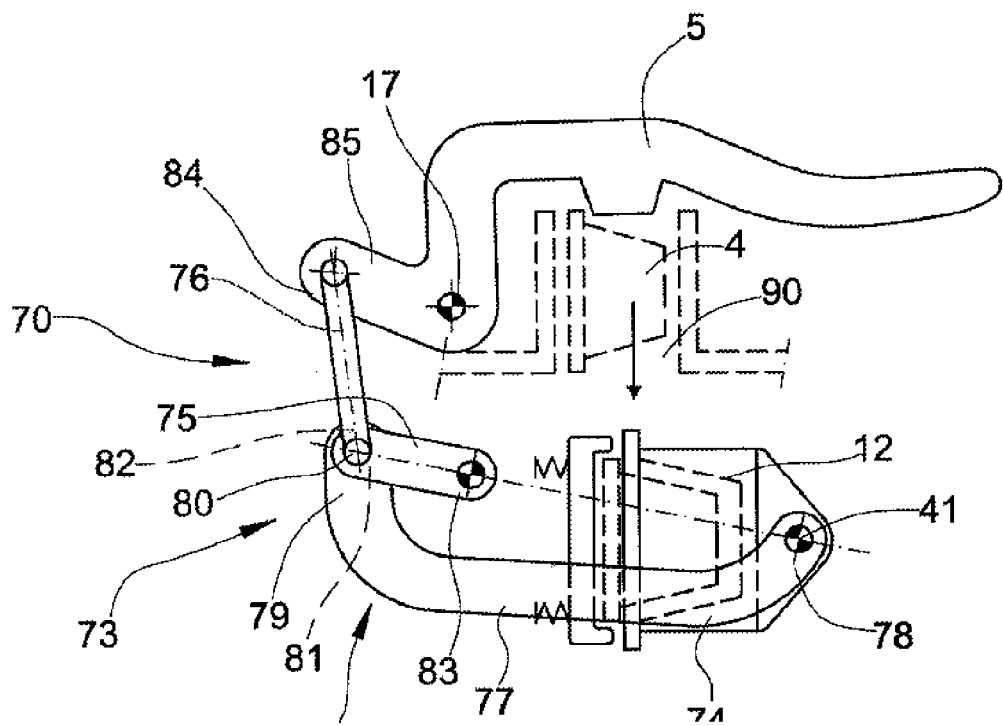

The actuator module 44 is removable and able to be replaced with another actuator module, for example a second manually operated actuator module 70, shown in FIGS. 5 and 6, which in turn comprises a support 43 (not shown in FIG. 5, but for example similar to the support 43 described above) and a locking assembly 72 which is instead a mechanical locking assembly which can be releasably connected to the lever 5 so as to be manually operated by means of the lever 5.

In particular, the mechanical locking assembly 72 comprises a toggle mechanism 73 which is configured so as to connect the lever 5 to the member 12 and move the member 12, which is for example constrained to the guides 31 by means of the projections 32 (as described above and not shown in detail in FIGS. 5 and 6) in the sliding direction S.

For example, the mechanism 73 comprises at least one tie-bar 74, an arm 75 and an operating rod 76. The tie-bar 74 comprises a bar 77 and two opposite longitudinal end portions 78, 79 projecting laterally from the bar 77; the portion 78 is hinged with the joint 41 of the member 12, while the portion 79 is hinged with an articulation 80 which also connects respective ends 81, 82 of the arm 75 and the rod 76; a second end 83 of the arm 75, opposite to the end 81, is hinged with the machine 1 (directly or by means of the support 43) and a second end 84 of the rod 76, opposite to the end 82, is hinged with a rear portion 85 of the lever 5 in an eccentric position relative to the rotational fulcrum 17 of the lever 5.

Preferably, the machine 1 also comprises a pre-chamber 90 (FIGS. 1 and 3) communicating with the compartment 3 and provided with a capsule recognition device 91 for detecting a code (for example, a bar code, a colour code, or any other kind of identification code of an optical, magnetic or other nature) indicated on the capsule 4; the recognition device 91 is connected to a control unit 92 (known and only schematically shown) which then selects the operating cycle of the machine 1 on the basis of the code detected, for example operating the boiler 61, the pump 63 and/or the locking assemblies 22, 72. For the sake of simplicity the connections between the control unit 92 and the other components of the machine 1 are not shown.

Both the configurations of the machine 1, i.e. the configuration with the motorized actuator module 44 and the configuration with the manually operated actuator module 70, are simple to realize and assemble, being moreover simple and reliable in terms of operation.

Moreover, it is possible to modify the machine 1 so as to pass from one configuration to another one in a simple and quick manner by replacing the motorized actuator module 44 with the manually operated actuator module 70 or vice versa.

The invention therefore also provides a method of equipping machines operating with capsules for the preparation of coffee and other hot beverages, so as to change the operating mode of a machine from manual/mechanical to motorized/electrical and/or vice versa. This method comprises the steps of:

preparing the machine 1 with the internal compartment 3, the lever 5 and the inner receiving seat 45 configured to receive the actuator module 44 or alternately the actuator module 70, and the circulation means 13;

preparing the actuator modules 44, 70 operating in different modes;

selecting an actuator module 44, 70 operating in the required modes and placing the actuator module 44, 70 selected inside the receiving seat 45;

fixing the actuator module 44, 70 inside the receiving seat 45 by means of the releasable fixing members 46.

During overhaul or maintenance of the machine 1, withdrawn from the market, it is therefore possible to modify the configuration and consequently the operating modes of the machine 1 by simply replacing an actuator module 44, 70 with another module.

Moreover, it is understood that modifications and variations may be made to that described and illustrated here, without departing from the scope of the invention as defined in the accompanying claims.

The invention claimed is:

1. Machine operating with capsules for the preparation of coffee and other hot beverages, comprising an inner compartment for housing a capsule during use, a lever hinged to the machine about a fulcrum for pushing the capsule into the compartment, closing means for enclosing the capsule inside an infusion chamber defined by a pair of oppositely arranged members and piercing the capsule on opposite sides, and circulation means for circulating a flow of hot pressurized water through the capsule inside the infusion chamber; the machine being characterized in that it is designed to be equipped selectively with a first motorized actuator module, which comprises a support and a first electro-mechanical locking assembly mounted on the support so as to form a preassembled interchangeable module, and with a second manually operated actuator module, which comprises a second mechanical locking assembly able to be releasably connected to a lever which can be operated by a user so as to be manually actuated by means of the lever, wherein the mechanical locking assembly comprises a toggle mechanism configured to connect the lever to a thrust member and move the thrust member in a substantially straight sliding direction (S), and wherein the toggle mechanism comprises at least one tie-bar, an arm and a rod; the tie-bar being hinged with the thrust member and with an articulation; the arm being hinged with the articulation and with the machine; the rod being hinged with the articulation and with the lever.

2. Machine according to claim 1, wherein the first actuator module is removably housed inside an inner receiving seat of the machine and is fixed to the machine by means of releasable fixing members so as to be removable from the receiving seat and replaced with a second manually operated actuator module.

3. Machine according to claim 1, wherein the first electro-mechanical locking assembly is connected to a first one of said members so as to move it towards the other member in an essentially straight sliding direction (S).

4. Machine according to claim 1, wherein the locking assembly comprises a gear motor and a connecting-rod and crank mechanism driven by the gear motor and connected to a thrust member by means of a joint, for displacing the thrust member in the sliding direction (S).

5. Machine according to claim 4, wherein the locking assembly comprises a crank connected to a shaft of the gear motor and to a connecting-rod hinged with the joint of the thrust member, the thrust member being mounted slidably in the sliding direction (S) inside a guide.

6. Machine according to claim 1, comprising further a pre-chamber communicating with the compartment and provided with a capsule recognition device for detecting a code indicated on the capsule.

7. Method of equipping machines operating with capsules for the preparation of coffee and other hot beverages, so as to change the operating mode of a machine from manual/mechanical to motorized/electrical and/or vice versa, comprising the steps of:

preparing a machine having an inner compartment for housing a capsule during use, a lever for pushing the capsule into the compartment, an inner receiving seat configured to receive an actuator module, and circulation means for circulating a flow of hot pressurized water through the capsule;

preparing at least two actuator modules operating in different modes, each actuator module comprising a support, a thrust member and a locking assembly which moves the thrust member and is mounted on the support so as to form a pre-assembled interchangeable module;

selecting one actuator module operating in the desired modes and placing the selected actuator module inside the receiving seat;

fixing the actuator module inside the receiving seat by means of releasable fixing members such that the actuator module is removable from the receiving seat for replacement by another actuator module wherein a first actuator module is an electrically operated, motorized, actuator module having an electro-mechanical locking assembly and a second actuator module is a manually operated actuator module having a mechanically locking assembly connectable in a releasable manner to the lever so that it can be operated manually by means of the lever.

8. Method according to claim 7, wherein the machine is provided with an abutment member mounted on a wall of the compartment and co-operating with the thrust member so as to enclose the capsule inside an infusion chamber defined by said members; the abutment member remaining mounted in the machine during the replacement of the actuator modules.

* * * * *